May 23, 1967

C. J. SEBO 3,321,219

FLEXIBLE CONDUIT CONNECTOR

Filed Aug. 3, 1966

INVENTOR.
CARL J. SEBO
BY

*Caesar, Rivise, Bernstein & Cohen*

ATTORNEYS.

United States Patent Office 3,321,219
Patented May 23, 1967

3,321,219
FLEXIBLE CONDUIT CONNECTOR
Carl J. Sebo, Clarks Summit, Pa., assignor to Atlas Electrical Fittings Co., Scranton, Pa., a corporation of Pennsylvania
Filed Aug. 3, 1966, Ser. No. 570,043
3 Claims. (Cl. 285—161)

This invention relates generally to electrical cable connections and more particularly to a connector for securing a flexible conduit to a terminal box.

There are at present various types of cable connectors for connecting a flexible conduit to a terminal box. One type of connector that is used includes a cylindrical barrel and a U-shaped securing piece having radially extending legs which is secured by a threaded screw to the barrel and is adapted to grasp the armor of the conduit cable to engage the cable within the barrel. Another type connector comprises a cylindrical housing having a screw threadedly secured therein and a U-shaped securing member, the legs of which extend axially with respect to the housing. The screw passes through a first leg of the securing member and urges the other leg of the securing member against the conduit in the housing. The disadvantage of each of these connectors is that the screw is required to withstand longitudinal and radial stresses as well as to maintain the U-shaped member on the housing. That is, the screw not only urges the U-shaped member against the armor of the cable but also must act as a guide for the member. Thus, when the connector is in use, the forces resulting from pulling or pushing the conduit are transmitted to the screw and often break the screw which may result in a faulty electrical connection.

Further, when not in use, the unloosening of a screw results in the loss of not only the screw but the U-shaped securing members. Since these U-shaped members have uses only on these specific connectors, replacement thereof usually requires replacement of the entire connector.

It is therefore an object of this invention to overcome the aforementioned disadvantages.

Another object of the invention is to provide a new and improved connector for a conduit having a planar securing member and a fastener, said securing member isolating the stresses in the conduit from said fastener.

Another object of the invention is to provide a new and improved connector for a flexible conduit in which the securing member is nonseparable from the housing thereof.

Another object of the invention is to provide a new and improved securing member which is inexpensive to manufacture and enables a quick connection between a flexible conduit and a terminal box.

These and other objects of the invention are achieved by providing a connecting member for a flexible conduit comprising a substantially cylindrical housing for receiving an end of said conduit, said housing having an integral U-shaped boss, said boss having a web and a pair of upstanding legs, said web including a threaded opening, a threaded member, said member extending through said opening substantially transversely to the axis of said housing, a planar securing member having an integral projection, said planar member adapted to be slid along said legs of said boss, said threaded member adapted to urge said planar member against said conduit so that said projection engages said conduit for a tight securement thereof to said connector, whereby said securing member acts to isolate forces in said conduit from said threaded member.

Other objects and many of the attendant advantages of this invention will be readily appreciated as the same becomes better understood by reference to the following detailed description when considered in connection with the accompanying drawings wherein.

Referring now in greater detail to the various figures of the drawings wherein similar reference characters refer to similar parts, a flexible conduit connector embodying the invention is generally shown at 10 in FIG. 1.

Figure 4:
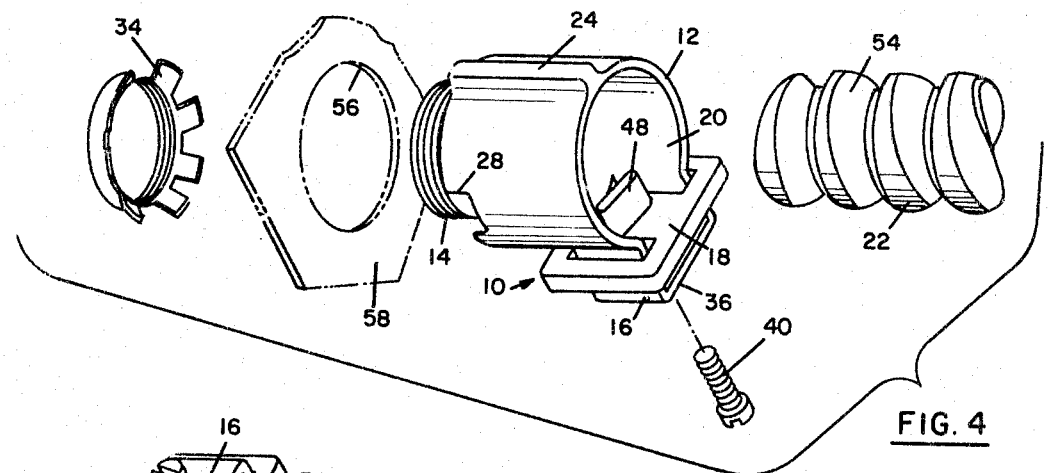
FIG. 4 is an exploded perspective view of the assembly shown in FIG. 2.

Connector 10 basically comprises a generally cylindrical housing 12, a cylindrical threaded projection 14, a U-shaped boss 16 and a securing member 18. The housing 12, projection 14 and boss 16 are preferably comprised of cast aluminum and are integrally formed.

Housing 12 includes an axially extending cylindrical bore 20 which is adapted to receive the end of a flexible conduit 22. Connector 10 is of general application and may receive the end of not only flexible conduits but also other electrical cables. The housing further includes a longitudinally extending rib 24 which is provided for purposes of alignment. The housing further includes an annular end wall 26 which is substantially planar and perpendicular to the axis of said housing and extends between said housing and the projection 14. The end wall 26 is discontinuous in three places. The cylindrical housing 12 includes three slots 28 which are adjacent the discontinuous portions of end wall 26. Openings 30 are formed by the discontinuation of end wall 26 and the slots 28 of housing 12. Openings 30 are provided to enable sighting of the end of the flexible conduit to insure that it is inserted deep enough into housing 12.

Projection 14 is integral with end wall 26 and is axially aligned with the housing 12. The projection includes a threaded surface 32 for receiving a threaded lock nut 34 as will be seen hereinafter.

The housing 12 is discontinuous at its forwardmost end and is integral thereat with boss 16. Boss 16 includes a planar rectangular web 36 and a pair of integral rectangular planar legs 38. Web 36 includes a threaded opening through which a threaded member 40 extends and is threadedly secured therein. The web 36 is substantially parallel to the axis of the housing and legs 38 are inclined somewhat towards the axis of the housing from the opposite edges of web 36.

Figure 5:
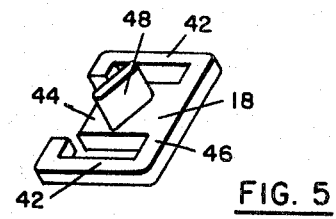
FIG. 5 is an enlarged perspective view of the securing member used on the connector embodying the invention.

Referring now to FIG. 5, it can be seen that the securing member 18 is substantially E-shaped and includes a pair of L-shaped end legs 42, a central rectangular leg 44 and a bridging section 46 which is integral with each of said legs. The end portions 47 of end legs 42 extend from the end legs towards the central leg 44. The securing member 18 further includes a rectangular projection 48 which is integral with the rectangular leg 44 and is substantially perpendicular thereto. It is slightly inclined with respect to bridging section 46 so that as will hereinafter be seen, it is aligned with the spacing between the layers of the spirally wound strip of cable armor for the flexible conduit.

Figure 1:
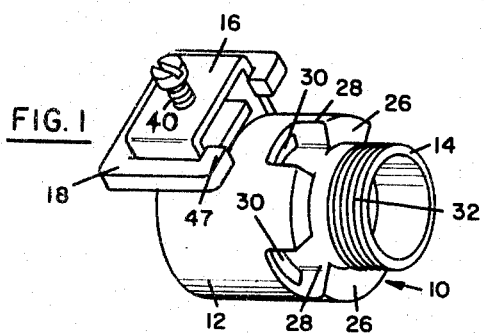
FIG. 1 is a perspective view of a connector for a flexible conduit embodying the invention.
Figure 3:
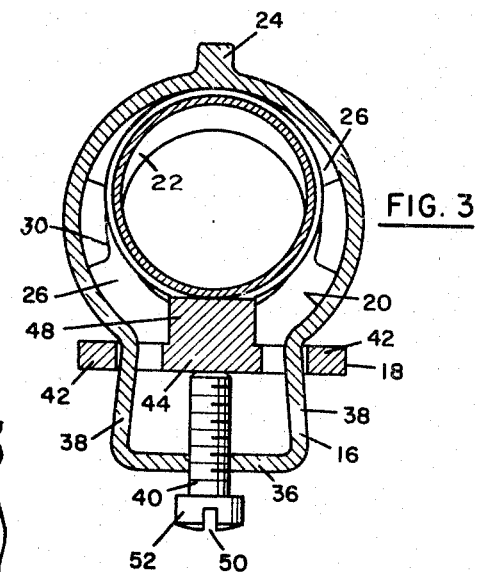
FIG. 3 is an enlarged sectional view taken along the line 3—3 in FIG. 2.

As best seen in FIGS. 1, 3 and 4, the securing member 18 is slidably secured to the boss 16 of the connector. The leg 44 extends between legs 38 of the boss and the L-shaped legs 18 extend about the outside surfaces of legs 38. The securing member 18 is therefore restrained against longitudinal movement by the end portions 47 and bridging section 46 which abut the opposite edges of legs 38 of the boss 16. Movement of the securing member 18 in a transverse direction is restricted by the end legs 42 abutting the lateral outside surfaces of the legs 38.

The projection 48 is disposed on the surface of leg 44 facing the axis of the housing 12. Thus, when the end of a flexible conduit is inserted into the housing, the securing member 18 is adapted to be urged against the conduit by appropriate rotation of the threaded member 40. As the threaded member 40 is rotated in a suitable direction, the end thereof urges the rectangular leg 44 and the projection 48 thereof against the armor of the flexible conduit.

Figure 2:
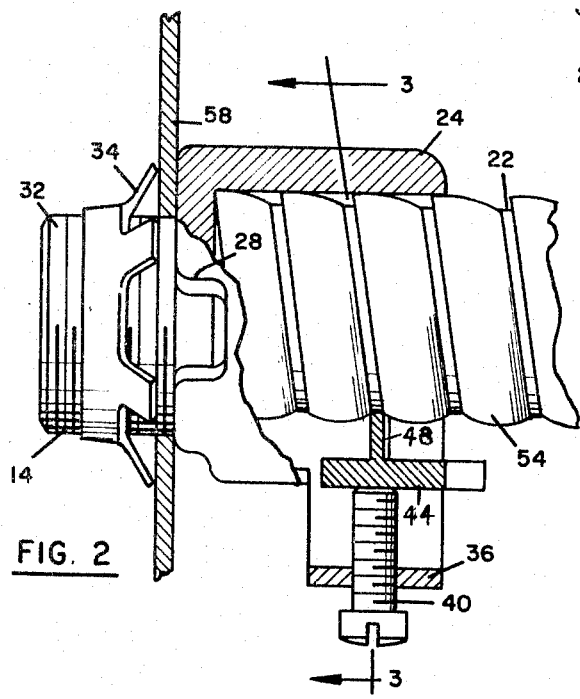
FIG. 2 is an enlarged side elevational view of the connector member embodying the invention securing a flexible conduit to an electrical terminal box with parts shown in vertical section for purposes of clarity.

In operation, the threaded member 40 is initially rotated so that the securing member 18 is adapted to be slid toward the web 36 of the boss and radially out of the cylindrical bore 20 of the housing 12. Thus, the opening of the housing is prepared to receive the end of a flexible conduit. The end of the conduit is thus inserted into the bore 20 of the housing and is urged against end wall 26 thereof until it is visible through openings 30. The threaded member 40 is then rotated by inserting a screw driver in slot 50 of the enlarged integral head 52 thereof. The rotation urges the rectangular leg 44 of the securing member 18 towards the conduit and thereby enables projection 48 to engage the conduit. As best seen in FIG. 2, the armor 54 of the conduit cable 22 is spirally wound about the cable. Therefore, the spacing between the cable is also in the form of a spiral. Thus, the path of the space between adjacent layers of the armor is slightly inclined with respect to a plane perpendicular to the axis of the cable. The projection 48 is therefore enabled to be aligned and inserted within the path for a tighter securement of said conduit.

After the conduit is secured in the housing of the connector, the threaded projection 14 of the connector may then be inserted through a circular opening 56 in the wall of a conventional terminal box 58. A lock nut 34 is then threadedly secured to the threaded portion 32 of projection 14 as shown in FIGS. 2 and 4 to secure the connector to the wall.

It can be therefore be seen that a connection between a conduit and a terminal box is facilitated by the provision of the flexible conduit connector embodying the invention. The connector is capable of withstanding forces applied thereto via the conduit in that the forces are taken up by the boss 16 rather than the threaded member 40. That is, the securing member 18 isolates the stresses in the conduit 22 from the threaded member by applying all lateral forces to the legs 38 of the boss 16. Since the boss is integral with the housing of the connector, it is capable of withstanding greater forces than the threaded member 40.

Although the securing member 18 is planar, and may be used without any deformation thereof, in operation, the central rectangular leg 44 may be bent slightly from the plane of the securing member 18. Thus, where a slightly smaller conduit is used than the connector is intended for, the central leg may be bent further into the housing to engage the outer surface of the conduit. Since the legs 42 of the securing member extend about the legs 38 of the boss 16, the securing member cannot be removed when the threaded member 40 is rotated out of the opening provided therefor in web 36. Thus, it is substantially impossible to lose the securing member of the connector. The threaded member 40 and lock nut 34 are conventional and therefore if lost may be easily replaced without substituting an entire connector assembly.

Without further elaboration, the foregoing will so fully illustrate my invention, that others may, by applying current or future knowledge, readily adapt the same for use under various conditions of service.

I claim:
1. A connecting member for a flexible conduit comprising a substantially cylindrical housing for receiving the end of said conduit, said housing having an integral U-shaped boss, said boss having a planar web and a pair of upstanding planar legs, said web including a threaded opening, a threaded member, said member extending through said opening substantially transversely to the axis of said housing, a planar securement member having an integral projection, said planar member adapted to be slid along said legs, said planar member being comprised of three legs which are secured together by an integral bridging member, said legs forming a pair of openings for receiving said upstanding planar legs, said threaded member adapted to urge said planar member against said conduit so that said projection engages said conduit for a tight securement thereof, whereby said planar member acts to isolate forces in said conduit from said threaded member.

2. The invention of claim 1 wherein said projection is integral with said central leg of said planar member and comprises a rectangular planar member so that it is aligned with the armor of said conduit when securing the conduit in said housing.

3. The invention of claim 1 wherein the outer pair of said three legs of said planar member are L-shaped and are symmetrically spaced from the central one of said legs.

References Cited by the Examiner
UNITED STATES PATENTS

| | | | |
|---|---|---|---|
| 1,770,883 | 7/1930 | Gangle | 285—161 |
| 2,084,961 | 6/1937 | Bondeson | 285—161 |
| 2,122,792 | 7/1938 | Bondeson | 285—161 |
| 2,490,286 | 12/1949 | Tornblom | 285—159 |
| 2,540,999 | 2/1951 | Thomas | 285—161 |
| 3,207,532 | 9/1965 | Sebo | 285—161 |

EDWARD C. ALLEN, *Primary Examiner.*

CARL W. TOMLIN, *Examiner.*

D. W. AROLA, J. L. KOHNEN, *Assistant Examiners.*